Jan. 18, 1949.　　　　　G. A. LYON　　　　2,459,569
WHEEL COVER
Filed Nov. 24, 1944
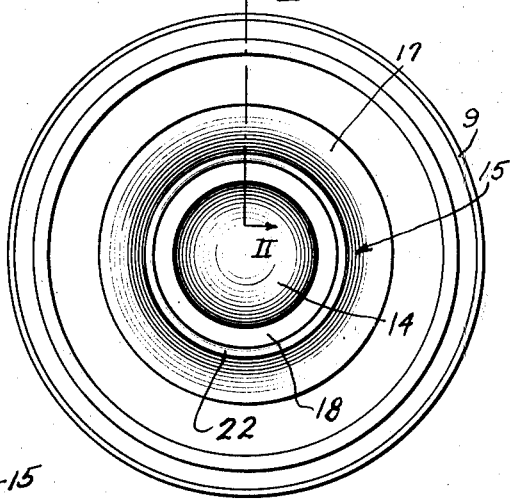
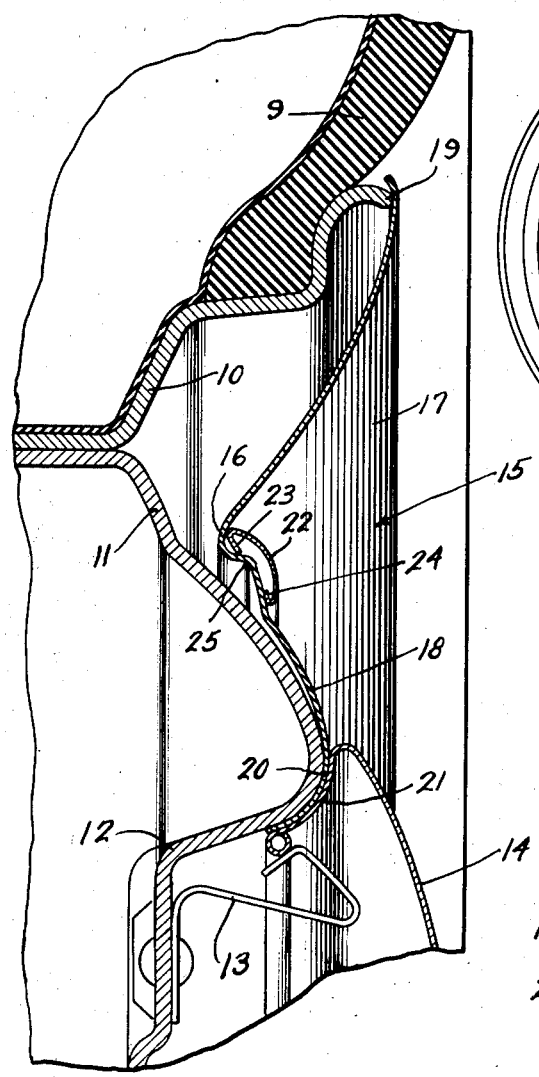
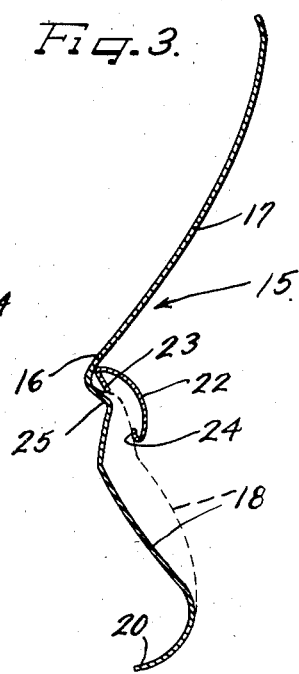
Inventor
GEORGE ALBERT LYON
by The firm of Charles K. Hill
Attys.

Patented Jan. 18, 1949

2,459,569

UNITED STATES PATENT OFFICE 2,459,569

WHEEL COVER

George Albert Lyon, Allenhurst, N. J.

Application November 24, 1944, Serial No. 564,972

6 Claims. (Cl. 301—37)

This invention relates to a wheel trim and more particularly to a multi part trim of a novel construction and arrangement to permit of ready disengagement of the parts.

An object of this invention is to provide a flexible wheel trim wherein the flexibility of the same may be utilized to effect disengagement from the rim of a part normally held thereon.

Still another object of the invention relates to the provision of a simplified form of wheel trim wherein an improved arrangement is provided for effecting the retention and disengagement of an ornamental trim ring normally carried by the trim.

In accordance with the general features of this invention, there is provided a novel article of manufacture embracing a circular wheel trim made of relatively thin pliable material, and having a portion thereof formed to retainingly receive a more rigid annular ring, said trim being flexible to dislodge the ring from retained engagement therewith.

A still further object of the invention relates to a provision of a cover structure for a wheel, including the usual multiflanged tire rim and body parts, wherein the cover is of such radial extent as to substantially conceal the exposed portion of the rim and body parts and wherein the cover is provided with an annular depression in which is retained an ornamental bead, a portion of the cover being distortable laterally to effect disengagement of the bead therefrom when desired.

Other objects and features of this invention will more fully appear from the following detailed description taken in connection with the accompanying drawings which illustrate several embodiments thereof and in which:

Figure 1 is a side elevation of a tire and wheel showing my cover applied thereto;

Figure 2 is an enlarged fragmentary cross sectional view taken on substantially the line II—II of Figure 1 looking in the direction indicated by the arrows; and Figure 3 is a cross sectional view of a wheel cover similar to that shown in Figure 2, illustrating how a portion of the cover may be distorted to disengage the ornamental bead therefrom, the dotted lines showing the normal position of the cover portion prior to distortion or deflection.

As shown on the drawings:

The reference character 10 designates generally a conventional drop center multiflanged tire rim in which is housed the usual tire and tube 9. The tire rim 10 is carried in the usual way on a load supporting bearing or body part 11, which is dished at its center 12 for attachment in the usual way to a support on a vehicle axle. This wheel carries the usual inverted type of hub cap retaining spring 13, which may be of any suitable number, such for example, as three to five. These springs cooperate in the usual way to retain a removable hub cap 14 at the center of the wheel assembly. Such structure is disclosed in numerous patents heretofore granted to me.

The present invention is particularly concerned with the provision of a novel form of wheel trim or cover for this wheel assembly. The cover is designated generally by the reference character 15. It may be made of any suitable thin material having transverse flexibility. Excellent results are obtainable by making this trim or cover 15 of a relatively thin thermoplastic material, such for example, as ethyl cellulose, vinyl resin, etc. The cover is of a circular configuration and embraces a centrally dished portion 16, which constitutes the junction of diverging radially outer and radially inner portions 17 and 18 respectively. The outer portion 17 is slightly turned and is adapted to engage an outer edge of the tire rim at 19. Moreover the portion 17 is of such convex configuration and depth as to appear, in use, to constitute a continuation of the curved outer side wall of the tire. This is obtained in part by having the portion 17 extend radially and axially inwardly from a point in close proximity to the tire to a point adjacent the body part 11 of the wheel.

I find that if the portion 17 is given an external white or eggshell finish, it will, in use, appear to be a white side wall portion of the tire. In other words, it causes an illusion of the tire appearing to extend clear down to the body part 11, thus making the wheel look as if it had a much larger tire than is actually the case.

The portion 18 is of such configuration as to closely follow the contour of the body part 11 and has an inner turned portion 20 constructed to extend into the dished portion 12 of the body part 11, and to be retainingly engaged by the skirt 21 of the hub cap 14. That is to say, the hub cap when it is snapped into retained engagement with the retaining clip 13 clamps the cover to the body part.

Also, it is clear, by reason of the flexibility of the portion 18, any slight manufacturing tolerance permitted in the body part 11 can be accommodated for. This is accomplished by reason of the fact that the portion 20 of the cover may be forced home against the nose of the body part by the hub cap as it is drawn into retained engagement by the clips. In practice I find it desirable to have the outer edge of the cover first engage the rim leaving the portion 18 slightly spaced from the body part. Thus, if there is any variation in the relative locations of the nose of the body part and the outer curled edge of the rim, such variation does not affect the use of the cover inasmuch as when the portion 18 is clamped against the body part it is deflected into engagement therewith.

My present invention, however, is particularly concerned with the retention of another part or a ring 22 on the cover 15. This ring may be made of any suitable material but is preferably made of a more rigid material than that of the cover proper. For illustration, the ring 22 may be made of stainless steel so that it may be given a high lustrous external finish. Thus if the plastic cover 15 is provided with colored portions 17 and 18, the lustrous ring 22 when retained on the cover enables a highly desirable advantageous contrasting color effect.

The ring or bead 22 is formed of convexly rounded or arched cross-section with its chordal plane frusto-conical and substantially parallel to the cross-sectional plane of the inner cover portion 18. The ring 22 is marginally reinforced and finished and for this purpose has a radially outer and axially inner turned under edge 23 and a radially inner and axially outer under-turned edge 24. One of these edges is adapted to be retainingly engaged with a part of the cover in the pocket of dished portion 16. I preferably use the radially outer edge 23 for this purpose. The cover portion 18 adjacent to the junction 16 is provided with a protuberance or shoulder 25 extending axially outwardly. This shoulder may be in a form of a continuous annular bend or may be interrupted if it is so desired. It is of such a diameter that the radially outer edge 23 of the bead when pressed thereover will retainingly grip the radially outer side of the same to hold the bead in the dished portion of the cover.

A particularly novel and advantageous aspect of my invention relates to the manner in which the bead 22 may be readily disengaged from its retained position on the cover 15. Such disengagement is desirable when it is necessary to replace the ring 22 or when the trim proper becomes damaged and it is desired to use the bead 22 over again in another cover structure.

Disengagement is very easily effected by flexing or distorting the portion 18 from the dotted line position shown in Figure 3 to the full line position. In the course of this flexure, the portion 18 is first disengaged from its contact with edge 24 of the bead 22 and thereafter the shoulder 25 is deflected radially and axially inwardly from underneath the extremity of edge 23. When the portion 18 is in this deflected position, the bead 22 may be lifted out of the dished portion 16 of the cover.

It will, of course, be appreciated that the foregoing flexure is only a temporary one, inasmuch as portion 18 will inherently spring back to its original contour in a position to receive another ring or bead 22.

Inasmuch as the radially inner cover portion 18 while in assembly with the wheel is held in the nose conforming portion 20 thereof tightly against the nose of the wheel body and even at the area of the shoulder 25 is relatively close to the axially outer side of the wheel body nose, as shown in Fig. 2, there will be no such axially inward deflection of the cover portion 18 as might tend to dislodge the bead 22 accidentally. To effect the aforesaid disengagement of the bead 22, therefore, requires removal of the cover from the wheel.

I claim as my invention:

1. A cover for a wheel structure including a tire rim and a load supporting body part defining a relatively deep outwardly opening groove therebetween, a cover member comprising integral rim concealing and body concealing portions divergingly related with the annular junction thereof arranged to extend rearwardly into said groove, one of said portions having an annular shoulder protruding outwardly adjacent to said juncture, and a reinforcing ring member having inturned engagement edge means in pressed-on engagement with the juncture side of said shoulder.

2. A cover for a wheel structure including a tire rim and a load supporting body part defining a relatively deep outwardly opening groove therebetween, a cover member comprising integral rim concealing and body concealing portions divergingly related with the annular juncture thereof arranged to extend readwardly into said groove, one of said portions having an annular shoulder protruding outwardly adjacent to said juncture, and a reinforcing ring member having inturned engagement edge means in pressed-on engagement with the juncture of said shoulder, said one cover portion being flexibly distortable by manipulation thereof to dislodge said shoulder by drawing the juncture side thereof from the gripping engagement of said reinforcing ring member.

3. A cover for a wheel structure including a tire rim and a load supporting body part defining a relatively deep annular outwardly opening groove therebetween, divergingly related integral cover portions adapted to have the juncture thereof extend into said groove, one of said portions being adapted to conceal the tire rim and being of a shape to conform generally to a tire side wall shape to serve in simulation of a tire side wall continuation extending well rearwardly into said groove, the other of said portions being engageable with the body part for attachment of the cover to the wheel structure, said cover portions being formed from a form-sustaining flexible plastic material whereby both portions are temporarily substantially deflectable and will spring back to original form when released, said body engaging portion having a shoulder adjacent to the juncture with the rim concealing portion and facing generally radially outwardly, and a reinforcing trim member having a radially arched form and including an inturned edge structure along its radially outer margin for press-on retaining engagement with the juncture side of said shoulder, said rim concealing portion of the cover being freely deflectable without disturbing the retaining engagement of the reinforcing ring member on the shoulder, said body engaging portion of the cover being rearwardly deflectable to withdraw said shoulder from the retaining engaged relationship with the reinforcing ring member to dislodge the ring member when desired.

4. In a cover for a wheel structure including a tire rim and a load supporting body part defining a relatively deep outwardly opening groove therebetween, integral rim-concealing and body-concealing circular cover portions divergently related with the annular junction thereof arranged to extend rearwardly into said groove, the body-concealing portion of the cover having a shoulder projecting from the face plane thereof adjacent to said juncture, and facing generally radially outwardly, and a reinforcing ring member of flat arched cross-section and having the margins thereof turned under, the cross-sectional chordal plane of said ring member substantially following the radial plane of said body-concealing cover portion and being of a diameter to fit in the juncture groove between the cover portions and with the radially outer turned under margin in gripping engagement with said shoulder, said body-concealing cover portion being flexibly distortable generally normal to its plane away from the reinforcing ring to dislodge said shoulder and draw it inwardly away from the gripping engagement of said radially outer ring margin.

5. In a wheel structure including a tire rim and a load supporting body part defining a relatively outwardly opening groove therebetween, the body part having an annular axially outwardly protruding reinforcing nose portion, a cover member comprising integral rim-concealing and body-concealing portions divergingly related with the annular junction thereof arranged to extend rearwardly into said groove, the radially inner cover portion being formed essentially complementary to said nose portion and snugly seating thereon, means securing the radially inner portion in said seating relation to the nose portion, said radially inner cover portion having a generally radially outwardly facing shoulder projecting generally axially outwardly from the plane thereof adjacent to said juncture, and a reinforcing ring member fitting in said juncture and held in place by gripping engagement with said shoulder, said radially inner cover portion being flexibly distortable by manipulation thereof when out of assembly with the wheel to flex the same generally axially inwardly normal to its plane to draw said shoulder from said gripping engagement by the reinforcing ring but being held against flexing when in assembly with the wheel whereby to hold the same against accidental dislodgement of said reinforcing ring.

6. A cover for a wheel structure including a tire rim and a load supporting body part with a relatively deep outwardly opening annular groove therebetween, a cover member comprising rim-concealing and body-concealing annular portions divergently related, the annular junction between said cover portions being arranged to extend rearwardly into said groove, the inner of said cover portions being arranged to engage the wheel body part and having an annular shoulder extending outwardly adjacent to said juncture and facing generally radially outwardly, and a circular member overlying said inner cover portion and having its outer edge directed into the groove formed by the convergence of said cover portions and engaging said shoulder.

GEORGE ALBERT LYON.

REFERENCES CITED

The following references are of record in the file of this patent:

UNITED STATES PATENTS

| Number | Name | Date |
| --- | --- | --- |
| 2,022,128 | Lyon | Nov. 26, 1935 |